Nov. 2, 1943.                J. SLEPIAN                 2,333,593
                       POWER TRANSLATING DEVICE
                        Filed Sept. 14, 1938          2 Sheets-Sheet 1

WITNESSES:                                    INVENTOR
                                             Joseph Slepian.
                                             BY
                                               ATTORNEY

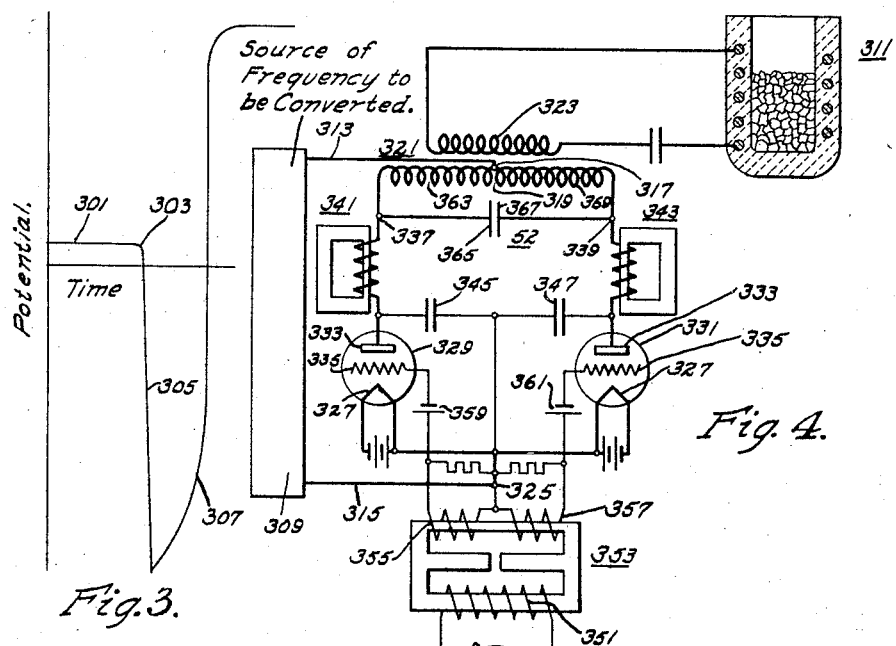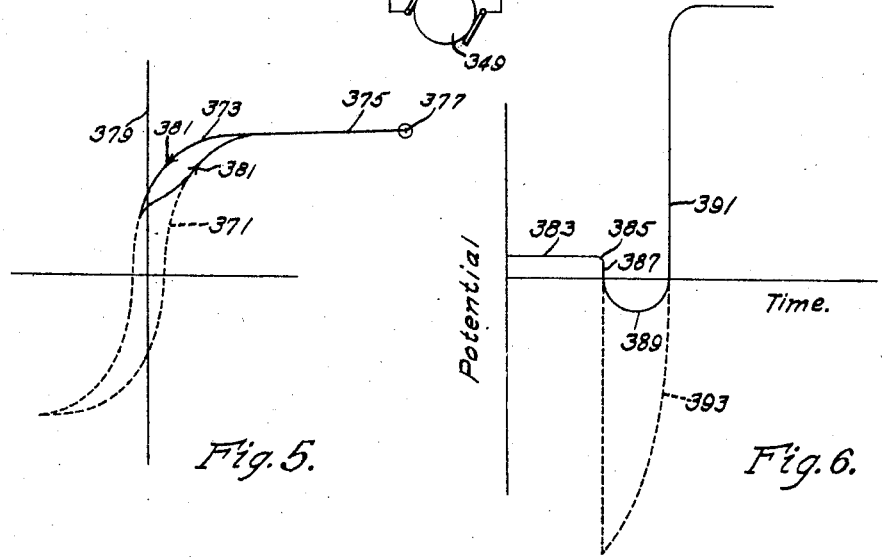

Patented Nov. 2, 1943

2,333,593

UNITED STATES PATENT OFFICE 2,333,593

POWER TRANSLATING DEVICE

Joseph Slepian, Pittsburgh, Pa., assignor to Westinghouse Electric & Manufacturing Company, East Pittsburgh, Pa., a corporation of Pennsylvania Application September 14, 1938, Serial No. 229,849

7 Claims. (Cl. 172—281)

My invention relates to electric translating apparatus and it has particular relation to translating apparatus utilizing rectifiers for converting electric power of one frequency to another.

The present application is a continuation-in-part of my application Serial No. 680,396, filed December 13, 1923 and assigned to the Westinghouse Electric & Manufacturing Company.

One object of my invention is to provide improved apparatus comprising rectifiers for translating direct current into alternating current.

Another object of my invention is to provide apparatus incorporating electric discharge valves for converting power of a given frequency into power of a predetermined frequency in which backfire in the valves during the commutation period shall be suppressed.

Still another object of my invention is to provide apparatus for rendering a conductive electric discharge valve of the arc-like type non-conductive in which the tendency of the valve to backfire just after it has been rendered nonconductive shall be suppressed.

My present invention utilizes commutating electromotive forces, derived either from the power system or from auxiliary apparatus, to secure efficient operation of translating devices employing mercury-arc rectifiers for converting direct current into alternating current.

With the foregoing and other objects in view, my invention consists in the arrangements, circuits, and methods of operation described and claimed hereinafter and illustrated in the accompanying drawings, wherein Fig. 1 is a diagrammatic view of a system for supplying single-phase alternating current from a direct current source by means of grid controlled mercury-arc rectifiers.

Fig. 3 is a graph illustrating a further aspect of the operation of the apparatus shown in Figure 1;

Fig. 4 is a diagrammatic view showing a modification of my invention in which the tendency to backfire when a discharge device is extinguished is suppressed;

Fig. 5 is a graph illustrating the operation of the backfire suppressing element in the Fig. 4 modification; and Fig. 6 is a graph illustrating the operation of the Fig. 4 modification.

Figure 1:
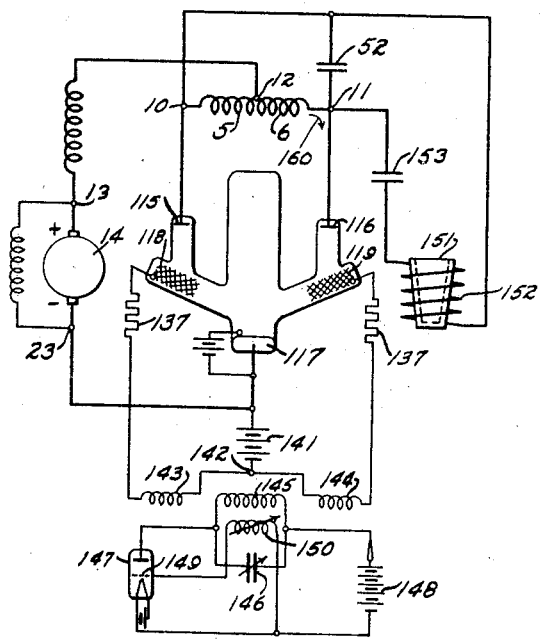

In Fig. 1, a system is shown in which the alternating current is supplied from a direct current source 14 to an induction heater coil 152. The current flows through a double-wave mercury rectifier and is controlled by means of grids disposed in the space-current paths of the rectifier. The two anodes 115 and 116 of the rectifier are connected to the two end terminals 10 and 11 of a transformer having two windings 5 and 6 provided with a common middle terminal 12 leading to a positive terminal 13 of the direct-current generator 14. The mercury electrode 117 of the rectifier is permanently connected to the negative terminal 23 of the direct-current generator 14 through a stabilizing inductance 15.

Two grids 118 and 119 are provided in the two rectifier paths leading between the mercury cathode 117 and the two anodes 115 and 116, for so controlling the rectifying action and conductivity of the paths as to utilize the direct current flowing from the direct-current generator 14 to supply power to the alternating-current load 152 which is connected across the two end terminals 10 and 11 of the transformer windings 5 and 6.

The construction of the grids and the characteristic phenomena of the control of currents in mercury-arc rectifiers are described and claimed in my patents 1,731,687 and 1,856,087 to V. K. Zworykin and D. Ulrey, both assigned to the Westinghouse Electric & Manufacturing Company.

As pointed out in the above-named patents, the mere application, to a grid disposed in the path of the current flow, of a potential opposing the flow of current therethrough, is frequently insufficient to stop a flow of current through a mercury-arc rectifier path through which a current has been initiated previously to the application of such potential. It is essential, for the successful operation of a grid controlled mercury-arc path, that the current therethrough be first reduced to zero before its conductivity can be reduced by the application of a current-blocking potential to the grid.

The conductivity of the paths 115—117 and 116—117 is controlled by a master oscillator which varies the potential impressed on the grids 118 and 119. The mercury cathode 117 is connected through a biasing battery 141 to a common terminal 142 of two secondary transformer windings 143 and 144 leading through current limiting resistors 137 to the grids 118 and 119, respectively. The secondary windings 143 and 144 of the grid control transformer cooperate with a primary transformer winding 145 which is included in an oscillating circuit with a condenser 146. A three-electrode tube 147 is connected in a circuit including a source of electromotive force, such as a battery 148, across the condenser 146. The grid 149 of the three-electrode tube 147 is connected, through a feedback coil 150, to the filament and serves to produce sustained oscillations in the circuit including the transformer winding 145 and the condenser 146.

As the oscillator 147—150 operates the blocking effect of the battery 141 on the grids 118 and 119 is counteracted during alternate intervals and the discharge paths 115—117 and 116—117 are rendered conductive alternately. Assume that at any instant the path 115—117 is conductive. In such an event current flows from the positive terminal 13 of the direct-current source to the neutral terminal 12 of the transformer windings, there dividing into two portions, one portion flowing directly through the transformer winding 5 to the end terminal 10, and the other portion flowing through the transformer winding 6 and the load device 3 to the end terminal 10, and thence through the anode 115 and past the grid 118 to the cathode 117 and through the stabilizing inductance 15 to the negative terminal 23 of the direct-current generator 14.

As the potential of oscillator 147—150 varies both of the grids 118 and 119 may become charged negatively with respect to the cathode 117. However, only the blocking action of the negatively charged grid 119 which is disposed in the non-conducting path 116—117 is effective to prevent the flow of current. The negatively charged grid 118, which is disposed in the conducting arm 115—117 of the rectifier, is of almost no effect whatsoever upon the current-flow conditions therein.

In the course of operation of the oscillator 147—150, the blocking effect of the negative charge upon the grid 119 is momentarily counteracted by the oscillator potential and a flow of current between the anode 116 and the cathode 117 is initiated. The commutating condenser 52 which has been previously charged to a potential tending to send a reversed current through the conducting arm towards the anode 115 of the rectifier, discharges and diverts the currents flowing through the anode 115 to the anode 116, whereupon the blocking effect of the negative charge upon the grid 118 becomes fully effective and the rectifier arm leading to the anode 115 becomes in turn non-conductive. This condition lasts until the oscillator potential again reverses, making the arm 115—117 of the rectifier conductive again.

The system illustrated in Fig. 1 is particularly well adapted for producing high-frequency currents such as are utilized in radio applications or for certain industrial purposes such as induction furnaces. I have illustrated an induction furnace comprising a crucible 151 surrounded by an inducing coil 152 which is connected in series with a condenser 153 across the terminals 10 and 11 of the transformer windings 5 and 6.

Figure 2:
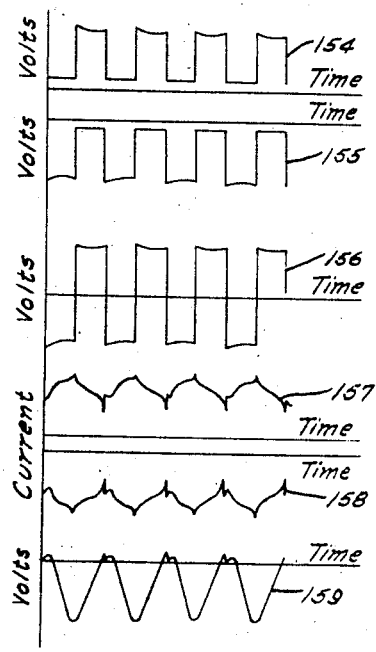
Fig. 2 are graphs showing the current and voltage conditions in the apparatus illustrated in Fig. 1.

To illustrate the operation of the system shown in Fig. 1, I have reproduced, in Fig. 2, oscillographic records obtained during the operation thereof. Curve 154 shows the voltage across the rectifier arm 115 as a function of time; curve 155 shows the voltage across the rectifier arm 116 as a function of time; curve 156 shows the voltage between the anodes 115 and 116 as a function of time; curve 157 shows the current through the transformer winding 5 and curve 158 shows the current through the transformer winding 6 as a function of time; and curve 159 shows the voltage between the grid 118 and the mercury cathode 117 as a function of time. In determining the direction of the voltage in the above diagrams, it has been assumed that the voltage in the direction of the arrow 160 from the middle terminal 12 through the anode 116, cathode 117 and anode 115 back to the neutral terminal 12 is positive. In determining the direction of flow of current, it has been assumed that a current flowing in the transformer windings 5 and 6 in the direction from right to left, that is from the end terminal 11 to the end terminal 10, is positive.

As will be seen from the above-described curves, the voltage across the rectifier arms pulsates from a low value, corresponding to the voltage drop of the rectifier when the arm is conducting, to a full value corresponding to the open-circuit conditions. The current in the transformer winding 5 leading to the conducting rectifier arm increases during the period that the arm is conducting, while the current through the transformer winding 6 leading to the non-conducting arm of the rectifier decreases. The voltage which appears across the two terminals 10 and 11 of the transformer windings 5 and 6, and which is also voltage across the two rectifier anodes 115 and 116, corresponds to the change in flux attendant upon the increase in the current of one transformer winding and the decrease of the current in the other transformer winding, both effects adding to each other since the direction of the currents are opposite. As seen from the above diagrams the current flowing from the direct-current source is divided into two approximately equal portions pulsating around mean values. The sum of both currents is approximately constant and corresponds to the total current flowing from the direct-current source.

It may thus be seen that only approximately half of the current flowing from the direct-current generator 14 flows into the alternating-current load circuit. The energy corresponding to the other half of the direct-current flow is utilized in raising the potential across the load circuit to approximately twice the potential of the direct-current generator, by a transformer action in the windings 5 and 6. It is to this end that the windings 5 and 6 are preferably arranged in inductive relation to each other although my system would also operate with two separate transformers or coils.

In the modifications of my invention discussed heretofore, there is a tendency for a discharge device that is being extinguished to backfire. This tendency arises from the fact that the reverse potential which is applied between the anode and the cathode of the discharge device being extinguished is of substantial magnitude and persists for some time after the device is actually extinguished. During this time the residual ionization in the discharge device is substantial, and the back potential existing in the presence of the ionization occasionally causes a discharge to take place with the anode of the extinguished device as emissive source and the cathode as anode.

The phenomenon involved here can be explained in detail with reference to Fig. 1, for example. Let it be assumed that in the modification disclosed in this view the discharge current has been flowing through the path 115—117. Under such circumstances, the capacitor 52 has been charged to a difference of potential equal to somewhat less than twice the potential of the source 14. At a time predetermined by the oscillator 147—150, the discharge path 116—117 is rendered conductive and the right-hand plate of capacitor 52 is, in effect, connected to the cathode 117. The inverse potential from the capacitor 52 is thus impressed across the path 115—117. The first result of the impressing of the potential is the extinguishing of the discharge in the latter path. However, after the discharge is extinguished, the capacitor potential still persists for a short time until the capacitor is discharged and recharged by the current flow through the path 116—117. It is this persisting potential in the presence of the residual ionization existing in the path 115—117 which tends to produce the backfire.

The potential relationship involved here is illustrated in Fig. 3. The potential impressed across the path 115—117 which is being extinguished is plotted vertically and time is plotted horizontally. Initially, the path 115—117 is conductive and, therefore, the potential across it is equal to the arc drop a relatively small magnitude, as indicated by the right-hand horizontal portion 301 of the Fig. 12 curve 303. When the path 116—117 is rendered conductive, the inverse potential of the capacitor 52 is applied reducing the current in path 115—117 to zero in a short time. The potential across the latter path then falls abruptly to a high negative as represented by the vertical drop 305 in the curve. By reason of the inductance of winding 5—6, the current in winding 5 continues to flow discharging into the condenser 52 and charging to the opposite polarity, while at the same time the current for winding 6 builds up. Therefore, the potential of the path 115—117 then rises with increasing sharpness to a substantially positive value which is equal to the potential of source 14 minus the potential drop across coil section 5, as represented by the loop 307 of the curve 303. The loop 307 is of substantial width and indicates that the negative potential persists for an appreciable interval of time. This interval is substantially longer than the time required for the discharge path 115—117 to be extinguished after the potential from the capacitor 52 is first applied. The tendency to backfire is produced by the negative potential which persists after the path is extinguished. In accordance with another aspect of my invention, the tendency to backfire is suppressed by reducing the magnitude of the potential which persists just after a discharge path has been extinguished.

The residual back potential is reduced by introducing in the anode-cathode circuit of the discharge paths a readily saturable reactor. Such a reactor ordinarily comprises one or more windings and a core constructed of metal of high permeability and low permanence, such as permalloy or hyperm.

Apparatus incorporating this feature is shown in Fig. 4. In this case, power derived from an available source 309 having a certain frequency is converted into power of another frequency, generally higher than the first, and supplied to a load such as an induction heater 311, for example. The original source 309 is represented in Fig. 4 by a square which is to be regarded as symbolical of any arrangement which may be encountered in the art. For example, the square may represent an ordinary commercial 60-cycle source, together with rectifiers and smoothing reactors, for obtaining direct current therefrom so that a direct-current potential is present between the input terminals 313 and 315 of the system. Or it may represent a direct-current generator, such as the element 14 in the other views. For the purpose of facilitating the explanation, it may be assumed that potential supplied to the input terminals is of the direct-current type and the upper terminal 313 is positive, while the lower one 315 is negative.

The positive terminal is connected to the intermediate tap 317 of the primary 319 of an output transformer 321, from the secondary 323 of which the induction heater 311 is supplied. The negative terminal 315 is connected to the common junction point 325 of the cathodes 327 of a pair of electric discharge valves 329 and 331 of the arc-like type. Each of the valves comprises, in addition to the cathode 327, an anode 333 and a control electrode 335 and a gaseous medium at a suitable pressure. While the valves 329 and 331 are shown as being of the hot cathode type, they may be of any other general type as, for example, mercury pool valves, such as the elements 115—117, 116—117, or electric discharge devices of the immersed ignition electrode type. Moreover, while only a single-phase system is disclosed in Fig. 13, my invention is equally as well applicable to a polyphase arrangement.

The anodes 333 of the valves 329 and 331 are connected to the terminals 337 and 339, respectively, of the primary 319 of the output transformer 321 through the windings of saturable reactors 341 and 343, respectively, of the type described above. The characteristic of the reactors 341 and 343 is such that they saturate for a current of a magnitude that is small compared to the normal current flow through the valves 329 and 331 and, therefore, their impedance to the normal current flow through the valves is negligible. On the other hand, when the current flow through the reactors is relatively small and particularly when it is being reversed, their impedance is substantial.

Between the anode 333 and the cathode 327 of each of the valves 329 and 331, small capacitors 345 and 347, respectively, are connected. The capacitors are of such magnitude that they do not divert the normal current flow through the valves. On the other hand, their impedance is small compared to the impedance of the reactors to small or reversing current.

For the purpose of controlling the valves 329 and 331, an auxiliary source 349 of the frequency desired and of small rating is provided. The source is connected across the primary 351 of a saturable transformer 353 provided with a pair of secondary windings 355 and 357. Each of the latter windings 355 and 357 is connected between the control electrode 335 and the cathode 327 of an associated valve 329 and 331, respectively, through suitable biasing sources 359 and 361, respectively. The current flowing through the primary 351 of the saturable transformer 353 induces impulses in the secondary windings 355 and 357, which are alternately of positive polarity and of sufficient magnitude to counteract the biasing potential sources 359 and 361 in the control circuits of the valves and render the valves conductive. For the purpose of commutating the valves, the usual commutating capacitor 52 is connected between the terminals 337 and 339 of the primary 319 of the output transformer 321.

When the left-hand valve 329 is conductive, for example, current flows from the positive terminal 313 of the source 309 through the left-hand section 363 of the primary 319 of the output transformer 321, the left-hand saturable reactor 341, the anode 333 and the cathode 327 of the left-hand valve 329 to the negative terminal 315 of the source. Corresponding current flow is induced in the secondary 323 of the transformer 321 and at the same time the commutating capacitor is charged with its left-hand plate 365 negative and its right-hand plate 367 positive. At a time predetermined by the frequency supplied to the saturable transformer 353, the right-hand valve 331 is rendered conductive. At this point, the right-hand plate 367 of the commutating capacitor 52 is, in effect, connected to the cathode 327 of the left-hand valve 329. The negative potential thus impressed across the valve 329 extinguishes it and the current flow now continues through the other valve 331 and the right-hand portion 369 of the primary 317.

The effect of the current flow through the valves 329 and 331 on the corresponding saturable reactors 341 and 343 is illustrated graphically in Fig. 5 for one of the reactors, say 341. In this view, the ordinary hysteresis curve 371 for the reactor is plotted in broken lines. The small full line loop 373 and the line 375 extending therefrom represent the operating curve of the reactor for the current variations in the associated valve 329. When the normal current flows through the valve, the situation is represented by a point 377 at a substantial distance from the vertical axis 379 on the line 375 extending from the loop 373. At this operating point, the reactor 341 is saturated and its impedance is small. When the other valve 331 is rendered conductive, the current flow through the valve 329 decreases and the operating point of the reactor moves towards the left to trace the loop in the direction of the arrow 381 in Fig. 5.

The current through the reactor 341 is first quickly reduced to zero. Further, as the potential across the associated valve 329 reverses, reversed current flows through the corresponding capacitor 345 and the reactor 341 must also carry reverse current. Since in such a case the reactor is operating on the portion of the loop 373 to the left of the vertical axis 379, and in this region the permeability is high, it has a very high impedance and, therefore, absorbs the greater portion of the potential drop impressed across it and the series capacitor 345. The potential drop across the series capacitor is the same as the drop across the associated valve 329, and the valve is thus no longer subjected to the danger of backfire by reason of the high residual reverse potential.

The potentials which are now impressed on the left-hand valve are illustrated graphically in Fig. 15. Here again the left-hand horizontal portion 383 of the curve 385 represents simply the arc drop across the valve 379. The abrupt drop 387 at the end of the horizontal portion 383 represents the application of the commutating capacitor potential 52 is applied. However, in this case, after the valve 329 is extinguished, the reactor 341 absorbs the greater portion of the potential, and the actual inverse potential impressed between the anode 333 and the cathode 327 of the valve is relatively small as represented by the full line loop 389. When the commutating capacitor 52 is completely discharged, the potential across the valve 329 rises to the source potential minus the potential drop across the left-hand portion 363 of the output transformer 321, as represented by the vertical portion 391 of the curve. The broken line curve 393 extending between the two vertical portions represents the potential drop across the reactor 341. The sum of the ordinates of the broken line loop 393 and the full line negative loop 389 is the total potential which is impressed during the commutating period.

In the claims the word "grid" is used. This word is to be taken not in its specific sense as applying to a perforated structure interposed between the anode and the cathode, as, for example, the elements 117 and 118 (Fig. 1), but in its general sense as signifying a control electrode of any type, as, for example, an ignition electrode.

My invention is based on a recognition of the basic principles governing the operation of mercury arcs and the control of currents flowing therethrough, and is not limited to the precise details, arrangements and methods which are described in the specification. Those skilled in the art will readily recognize that my invention may be practically embodied in many other ways without departing from the spirit thereof and I desire, therefore, that only such limitations shall be placed thereon as are imposed by the prior art or set forth in the appended claims.

I claim as my invention:

1. In combination, an electric discharge valve of the arc-like type having a plurality of principal electrodes, means for rendering said valve conductive, means for rendering said valve non-conductive after it has been rendered conductive, the last said means including means for impressing a substantial potential between said principal electrodes opposing the conduction of current through said valve, and a reactor, which becomes saturated for current of a magnitude that is small compared to the current normally conducted by said valve but which has a high impedance to currents of a magnitude smaller than said small magnitude, in circuit with said valve.

2. In combination, an electric discharge valve of the arc-like type having a plurality of principal electrodes, means for rendering said valve conductive, means for rendering said valve non-conductive after it has been rendered conductive, the last said means including means for impressing a substantial potential between said principal electrodes opposing the conduction of current through said valve, a reactor, which becomes saturated for current of a magnitude that is small compared to the current normally conducted by said valve but which has a high impedance to currents of a magnitude smaller than said small magnitude, in series with said valve, and a capacitor in parallel with said valve which is of such small magnitude that only a negligible portion of the normal current flow through said valve is diverted thereby but of sufficient magnitude to have an impedance small compared to that of said reactor when the latter is unsaturated.

3. In combination, an electric discharge valve of the arc-like type having a plurality of principal electrodes, means for rendering said valve conductive, means for rendering said valve non-conductive after it has been rendered conductive, the last said means including means for impressing a substantial potential between said principal electrodes opposing the conduction of current through said valve, a reactor, which becomes saturated for current of a magnitude that is small compared to the current normally conducted by said valve but which has a high impedance to currents of a magnitude smaller than said small magnitude, in series with said valve, and an impedance in parallel with said valve which is of a magnitude small compared to that of the impedance of said reactor when unsaturated but such that only a negligible portion of the normal current flow through said valve is diverted thereby.

4. For use in transferring power from a first circuit to a second circuit, said second circuit being periodic, the combination comprising a plurality of electric discharge valves of the arc-like type each having an anode, a cathode and a control electrode interposed between said first circuit and said second circuit, means for impressing a periodic potential having the frequency of said second circuit on the control electrodes of said valves to render said valves alternately conductive, means interconnecting said valves and functioning to render a conductive valve non-conductive when the other valve, being originally non-conductive, is rendered conductive and reactive means connected in series with the anode and the cathode of each said valves, said reactive means becoming saturated for current of a magnitude that is small compared to the magnitude of the current normally flowing through said valve and having a high impedance to current of a magnitude smaller than said small magnitude.

5. For use in transferring power from a first circuit to a second circuit, said second circuit being periodic, the combination comprising a plurality of electric discharge valves of the arc-like type each having an anode, a cathode, and a control electrode interposed between said first circuit and said second circuit, means for impressing a periodic potential of the frequency of said second circuit on the control electrodes of said valves to render said valves alternately conductive, charge storing means interconnecting said valves and functioning to render a conductive valve non-conductive when the other valve, being originally non-conductive, is rendered conductive and reactive means connected in series with the anode and the cathode of each said valves, said reactive means becoming saturated for current of a magnitude that is small compared to the magnitude of the current normally flowing through said valve and having a high impedance to current of a magnitude smaller than said small magnitude.

6. For use in transferring power from a first circuit to a second circuit, said second circuit being periodic, the combination comprising a plurality of electric discharge valves of the arc-like type each having an anode, a cathode and a control electrode interposed between said first circuit and said second circuit, means for impressing a periodic potential of the frequency of said second circuit on the control electrodes of said valves to render said valves alternately conductive, means interconnecting said valves and functioning to render a conductive valve non-conductive when the other valve, being originally non-conductive, is rendered conductive, reactive means connected in series with the anode and the cathode of each said valves, said reactive means becoming saturated for current of a magnitude that is small compared to the magnitude of the current normally flowing through said valve and having a high impedance to current of a magnitude smaller than said small magnitude, and impedance means in parallel with the anode and cathode of each said valves, said impedance means having a magnitude small compared to the impedance of the reactor when unsaturated but sufficient to prevent the inversion of any current flow through said valve thereby.

7. For use in transferring power from a first circuit to a second circuit, said second circuit being periodic, the combination comprising a plurality of electric discharge valves of the arc-like type each having an anode, a cathode and a control electrode interposed between said first circuit and said second circuit, means for impressing a potential of the frequency of said second circuit on the control electrodes of said valves to render said valves alternately conductive, means interconnecting said valves and functioning to render a conductive valve non-conductive when the other valve, being originally non-conductive, is rendered conductive and reactive means connected in series with the anode and the cathode of each said valves, said reactive means becoming saturated for current of a magnitude that is small compared to the magnitude of the current normally flowing through said valve and having a high impedance to current of a magnitude smaller than said small magnitude.

JOSEPH SLEPIAN.